March 24, 1953 H. G. IVATT 2,632,405
RAILWAY TRUCK
Filed Dec. 13, 1948 2 SHEETS—SHEET 1

Inventor
Henry G Ivatt
By Rodney Bodell
ATTY.

March 24, 1953  H. G. IVATT  2,632,405
RAILWAY TRUCK
Filed Dec. 13, 1948  2 SHEETS—SHEET 2
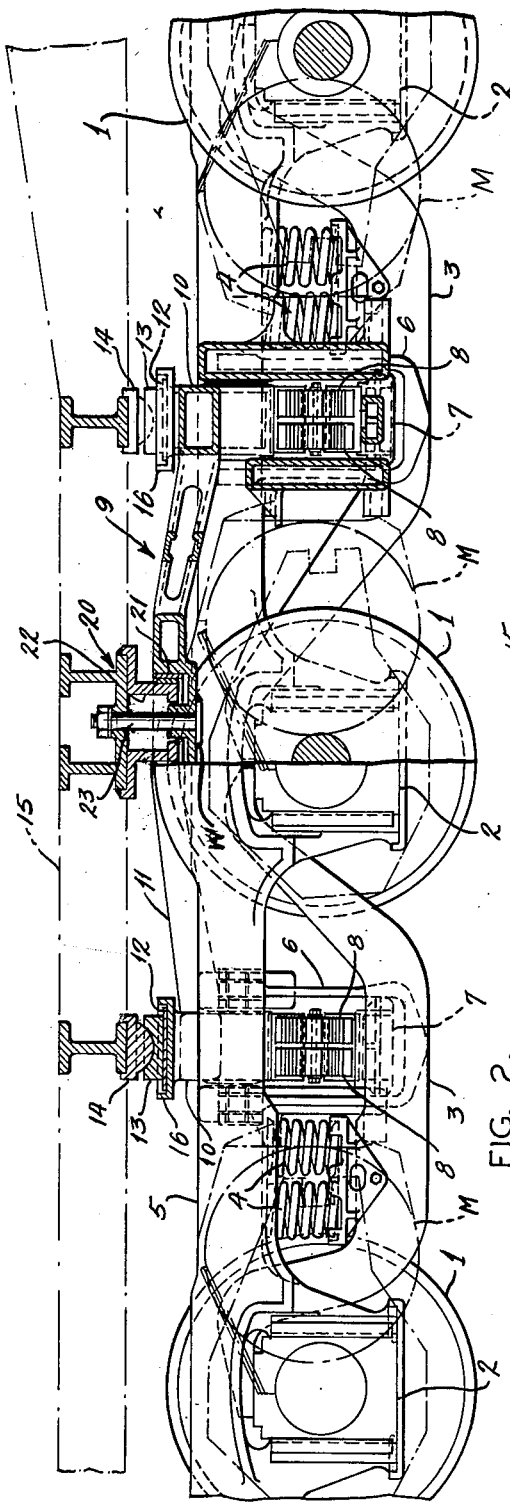
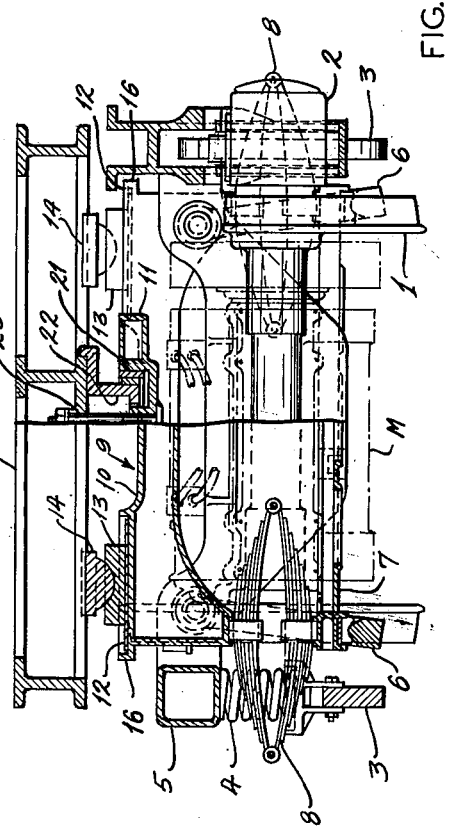
Inventor
Henry G. Ivatt
By Rodney Perdell
Atty Patented Mar. 24, 1953

2,632,405

UNITED STATES PATENT OFFICE 2,632,405

RAILWAY TRUCK

Henry George Ivatt, Melbourne, England, assignor to General Steel Castings Corporation, Granite City, Ill., a corporation of Delaware Application December 13, 1948, Serial No. 65,050

5 Claims. (Cl. 105—188)

The invention relates to railway vehicles and more particularly to the support of a vehicle body on a six wheel motor truck such as embodied in an electric locomotive.

In one type of railway truck used heretofore, the vehicle body was supported from the truck by cooperating body and truck center plates. While the body and truck had side bearings to limit transverse rocking of the vehicle body about the center plate, the side bearings carried none of the normal load. The truck bolster had to be made substantially deep near its center to support the weight of the body applied to the truck bolster at the center plate.

In a four wheel motor truck the bolster is intermediate the axles and the motors mounted on the axles are not likely to interfere with the bolster, but in a six wheel motor truck with motors for each axle the middle axle would be immediately beneath the center plate and there would not be enough room above the motor on the middle axle to accommodate a bolster having the usual center plate unless the bolster, and the body underframe carried thereby, is positioned at a higher level than is required by other factors of construction and higher than is good practice in view of the general objective of keeping the center of gravity of the vehicle as close to the rail as is practical.

The main object of the present invention is to provide a six wheel motor truck with a separate motor for each wheel and axle assembly and with a center pivot connection to the body and to maintain the body at a level as close to the rail as practical, as it would occupy in the usual arrangement of a bolster center plate support over a middle axle which does not have a motor associated with it.

Another object is to provide such a truck with a lateral motion bolster having a center pivot connection with the vehicle body without interfering with the motor on the middle axle.

These general objects, and other detail objects as will appear below, are attained by supporting the vehicle body on a lateral motion truck bolster solely at points spaced horizontally from a center pivot which forms a swivel connection between the truck and the vehicle body carried thereon and transmits traction and brake retardation forces. The center pivot is approximately over the center axle, and its motor, and preferably the body supporting elements are positioned between the center axle and each of the end axles and near the sides of the truck.

A high degree of stability is attained by the preferred arrangement of supporting the truck bolster at points near the sides of the truck and supporting the vehicle body on bearings substantially directly above the supports for the truck bolster, instead of using the customary bolster with a center plate for supporting the body load, with side bearings which limit the tilting of the vehicle body but do not normally support the body.

This arrangement makes possible the use of a bolster of the familiar H-shape but having a shallow depth throughout its length and width, thus readily accommodating the axle motors and other truck gear.

Other objects will be apparent to those skilled in the art from the following description and accompanying drawings in which:

Figure 2 is in part a side view and in part a longitudinal vertical section taken approximately one the line 2—2 of Figure 1, the vehicle body bearing structure at the left hand end of the truck being shown in vertical section.

Figure 3 is a transverse vertical section taken approximately on the line 3—3 of Figure 1.

Figure 1:
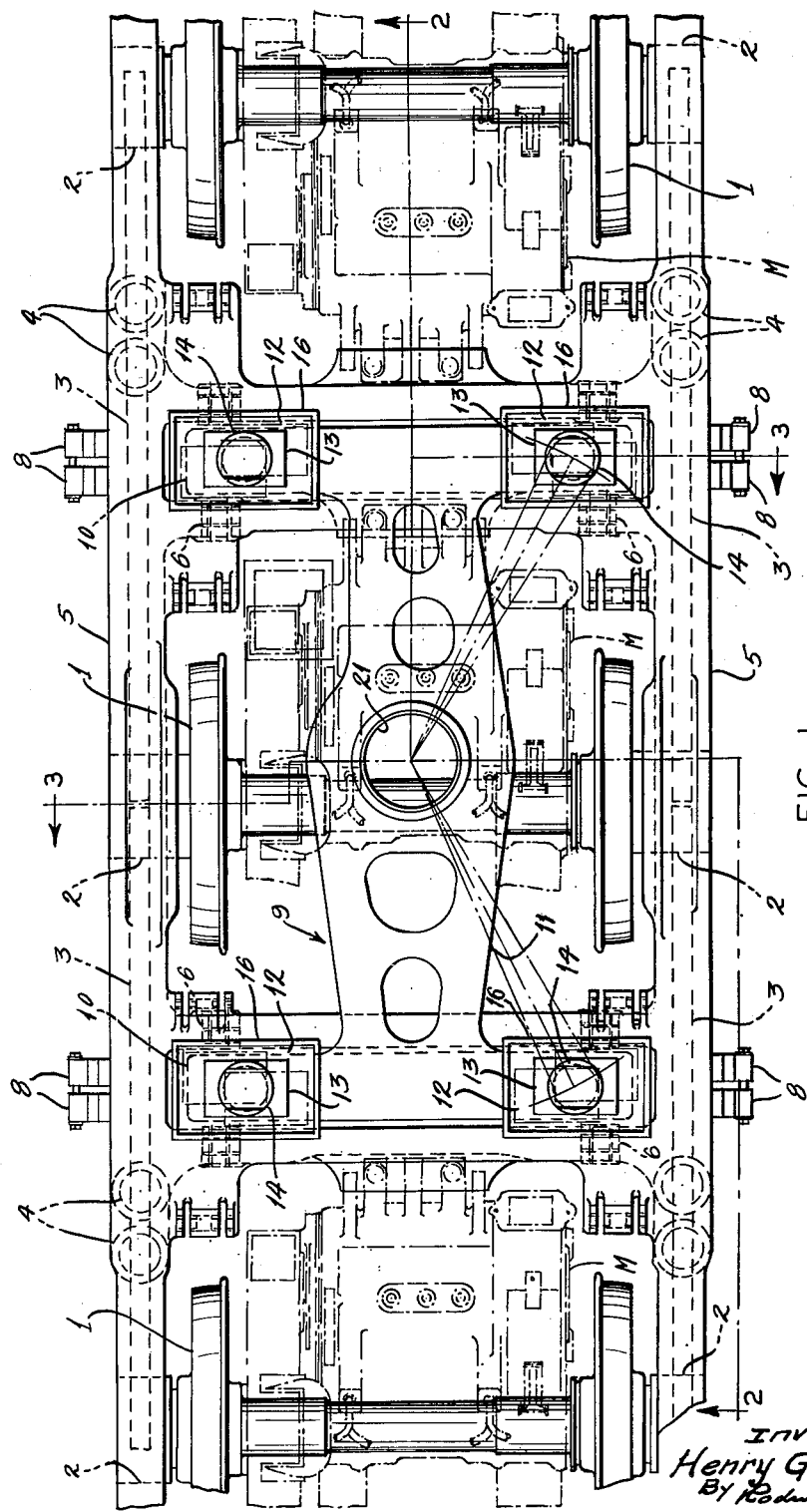
Figure 1 is a top view of a six wheel motor truck constructed according to the invention.

The truck includes the usual wheel and axle assemblies 1 and journal boxes 2. Each axle carries an electric motor M. Equalizers 3 are mounted on boxes 2 and mount truck springs 4 to carry a truck frame 5. The truck is of the lateral motion bolster type and has pairs of swing hangers 6 pivotally suspended from opposite sides of the truck frame at points intermediate the middle axle and each end axle. Spring planks 7 carried by the swing hangers mount bolster springs 8.

An H-shaped bolster 9 has the ends of its parallel transverse members 10 carried on springs 8 and its central longitudinal member 11 extends between transverse members 10 and over the middle axle and its motor M.

A bearing 12 is provided at each end of each transverse member and is positioned directly above a bolster spring 8 and slidingly mounts a concave block 13 supporting an associated convex block 14 on the body underframe 15. Bearings 12 provide the sole supports for the vehicle body.

Each bolster bearing 12 includes an upstanding peripheral rib 16 to retain lubricant between the sliding bearing surfaces. The bearings can be lubricated either by forced feed or oil bath.

The relative sizes of associated bearing 12 and block 13 are such that the peripheral rib 16 accommodates the relative movement of bearing 12 and block 13 when the vehicle traverses track of maximum curvature.

Instead of sliding bearings, rollers or rockers may be used.

A center pivot 20 swivels the truck to the vehicle body underframe and transmits traction and brake retardation forces between the truck and body, but none of the body load is supported by the center pivot. The entire body load is carried on the four corners of the bolster by bearings 12.

Center pivot 20 includes an upwardly facing cylindrical part 21 rigid with truck bolster member 11 and a downwardly facing cylindrical part 22 rotatable within part 21 and rigid with the body underframe. A vertical bolt 23, welded to bolster member 11 at W, extends axially through cylindrical parts 21 and 22 and prevents vertical separation of the truck from the vehicle body.

The electric motor M mounted on the middle axle is positioned directly below pivot 20 and longitudinal bolster member 11 which member may be relatively shallow since it carries none of the body load.

With the present construction, ample space is provided for the motor on the middle wheel and axle assembly. The truck bolster and the vehicle body may move transversely of the truck frame and axle wheel assemblies, due to the action of swing hangers 6, without interfering with the motors.

The shallow bolster structure extends over the motor on the center axle and the vehicle body is located close to the rail, and the arrangement provides stability because the center of gravity is low. This also improves the appearance of the locomotive since there is little space between the truck and vehicle underframing as compared to a locomotive with a motor on the center axle and with a deep bolster which carries the load solely on the bolster center plate. Since the truck load is supported entirely by the four supports on the bolster spaced from the center pivot structure, no vertical forces are applied to the center pivot which positions the truck relative to the vehicle body and transmits traction and brake retardation forces between the truck and the car body.

With this arrangement the center pivot is at substantially the same level as the body supporting bearings at the sides of the truck and easily clears the motor on the center axle. This makes it possible to use a body underframe of shallow construction, as compared to an underframe with a deep center sill structure over the truck to carry the vehicle load, without positioning the underframe at an undesirably high level.

The details of the construction may be varied substantially without departing from the spirit of the invention and the exclusive use of those modifications coming within the scope of the claims is contemplated.

What is claimed is:

1. In a railway vehicle truck, three wheel-and-axle assemblies, a driving motor closely associated with the middle assembly, a truck frame supported from said assemblies, an H-shaped bolster including substantially parallel members, each having relatively deep ends and a relatively shallow intermediate portion, and including a correspondingly shallow central longitudinal member over said motor and between said intermediate parts, means supporting said bolster from each side of the truck frame at the ends of said parallel members and providing for movement of said bolster laterally of the truck frame, and bearings on the bolster positioned substantially directly above said means and at the ends of said parallel members to provide the sole support for a vehicle body.

2. In a railway vehicle truck, three wheel-and-axle-assemblies, a driving motor closely associated with the middle assembly, a truck frame supported from said assemblies, pairs of swing hangers pivotally suspended from each side of the truck frame at points spaced longitudinally of the truck, a pair of spring planks extending transversely of the truck and spaced longitudinally of the truck and supported at their ends by said swing hanger pairs, bolster springs mounted on the ends of said spring planks, an H-shaped bolster including spaced end members extending transversely of the truck, with downwardly extending end portions supported on said springs, and including a member extending longitudinally of the truck between said transverse members and arched upwardly over said motor, said bolster being movable by said hangers laterally of the truck, and bearings on the ends of said bolster transverse members positioned substantially directly above the bolster spring seats and providing the sole support for the vehicle body.

3. In a railway vehicle truck, three wheel and axle assemblies, a driving motor operatively connected to the middle assembly, equalizers between the middle assembly and each end assembly, springs carried on said equalizers, a truck frame mounted on said springs, swing hangers pivotally suspended from each side of the truck frame at points spaced longitudinally of the truck and inwardly from said equalizers, a pair of spring planks extending transversely of the truck and spaced apart longitudinally of the truck and supported at their ends by said swing hangers, bolster springs mounted on the ends of said spring planks, an H-shaped bolster including spaced parallel members extending transversely of the truck, and arched upwardly towards the center of the truck, and a connecting member extending longitudinally of the truck and arched upwardly above said motor, said bolster being supported at the ends of its parallel members from said bolster springs and being movable by said hangers laterally of the truck, and bearings on said bolster parallel members positioned substantially directly above the bolster springs and providing the sole support for the vehicle body.

4. In a railway vehicle truck, three wheeled axles, a motor adjacent to and operably connected to the middle axle, a truck frame supported from all of said axles, an H-shaped bolster including spaced end members extending transversely of the truck and a central member connecting said end members and extending longitudinally of the center of the truck, the ends of said bolster transverse end members being supported from the truck frame, and bearings on the bolster substantially directly above the spring-supported end members of the bolster to provide the sole support for a vehicle body, the intermediate portion of the central member of the bolster above the middle axle being positioned at a level corresponding to the level of the tops of the wheels on said middle axle to clear said motor and including a bearing for a center pin to pivotally assemble the truck with the vehicle body.

5. In a railway vehicle truck, three wheeled axles, a motor adjacent to and operably connected to each axle, a truck frame supported from all of said axles, swing hangers, supports therefor on the upper portions of said frame intermediate the middle axle and each end axle, an H-shaped bolster including spaced end members extending transversely of the truck and a central member connecting said end members and extending longitudinally of the center of the truck, the ends of said bolster transverse end members being spring-supported on said hangers for movement laterally of the truck, and bearings on the bolster substantially directly above the spring-supported end members of the bolster to provide the sole support for a vehicle body, said bolster end members being arched upwardly towards the center of the truck from the spring-supported portions and said bolster central member being arched upwardly from the intermediate portions of said end members over the middle axle and associated motor, and including a bearing for a center pin to pivotally assemble the truck with the vehicle body.

HENRY GEORGE IVATT.

REFERENCES CITED

The following references are of record in the file of this patent:

UNITED STATES PATENTS

| Number | Name | Date |
|---|---|---|
| 927,386 | Vauclain | July 6, 1909 |
| 1,466,590 | Kelley | Aug. 28, 1923 |
| 1,895,500 | Todd | Jan. 31, 1933 |
| 2,087,471 | Drenning | July 20, 1937 |
| 2,258,656 | McCormick | Oct. 14, 1941 |

FOREIGN PATENTS

| Number | Country | Date |
|---|---|---|
| 325,382 | Great Britain | Feb. 20, 1930 |